Patented Sept. 19, 1922.

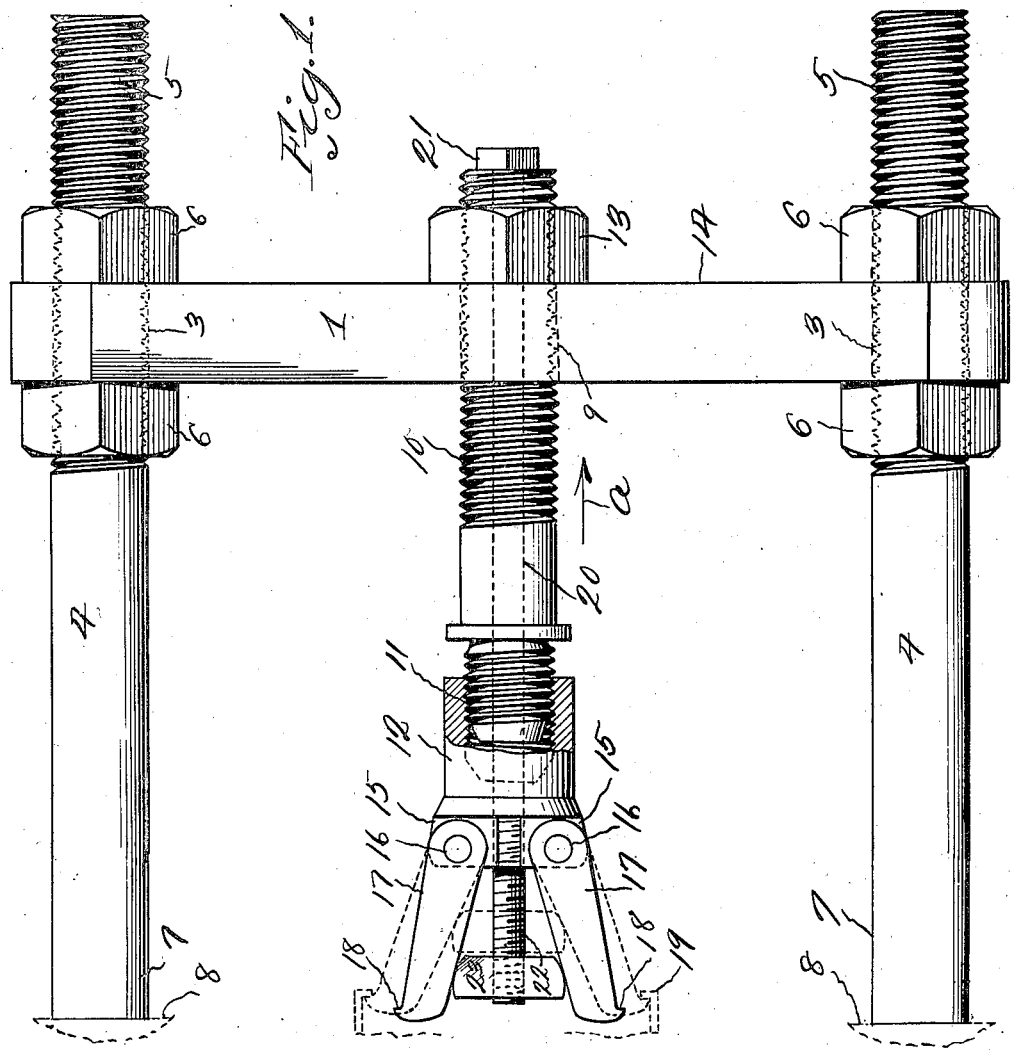
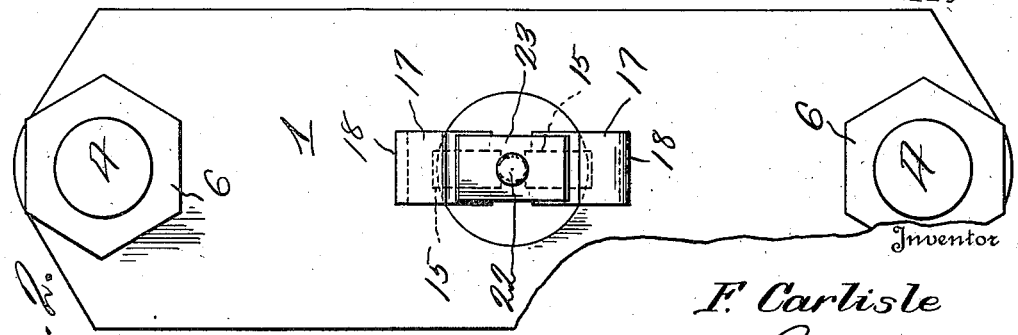

1,429,567

UNITED STATES PATENT OFFICE.

FRED CARLISLE, OF TULSA, OKLAHOMA.

BEARING-CUP PULLER.

Application filed March 22, 1921. Serial No. 454,385.

*To all whom it may concern:*

Be it known that I, FRED CARLISLE, a citizen of the United States, residing at Tulsa, in the county of Tulsa, State of Oklahoma, have invented a new and useful Bearing-Cup Puller; and I do hereby declare the following to be a full, clear, and exact description of the invention, such as will enable others skilled in the art to which it appertains to make and use the same.

The invention relates to bearing pullers and has for its object to provide a device of this character particularly adapted for removing bearings of the cage type from vehicle wheels or from any other place desired.

A further object is to provide a bearing puller comprising a bar, said bar having adjacent its end adjustable members adapted to engage adjacent the bearing which is to be pulled and to provide centrally of the bar an adjustable screw, the lower end of which is provided with pivotal dogs adapted to engage within the bearing and to be forced into binding engagement with the wall of the bearing by an adjusting screw extending through the threaded shaft and provided with a block disposed between the pivoted dogs.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the puller, part being broken away to better illustrate the structure.

Figure 2 is an end view of the puller.

Referring to the drawings, the numeral 1 designates a bar, which bar has extending through apertures 3 adjacent its ends supporting shafts 4, the ends 5 of which are threaded and provided with nuts 6, by means of which nuts the shafts 4 may be held in various adjusted positions with their ends 7 in engagement with portions 8 of a wheel or any other article from which the bearing is being removed. Extending through a centrally disposed aperture 9 in the bar 1 is a screw 10, which screw is in parallel relation to the shafts 4 and has threaded as at 11 on one of its ends an adjustable head 12, which head may be adjusted outwardly or inwardly as desired. The threaded screw 10 has threaded thereon a nut 13, which nut engages the outer face 14 of the bar 1 and by means of which nut the threaded screw 10 may be moved in the direction of arrow *a* during a bearing pulling operation.

The adjustable head 12 is provided with spaced lugs 15, to which lugs are pivoted as at 16 bearing engaging dogs 17, for purposes of illustration only two dogs are shown, however as many dogs may be used as desired. The ends of the dogs 17 terminate in outwardly extending hooks 18, which hooks when forced outwardly to the position shown in Figure 1 engage within the bearing sleeve 19 so that when the nut 14 is rotated and the threaded shaft 10 moved in the direction of the arrow *a* the bearing will be pulled out of its seat. Extending axially through the threaded shaft 10 is the shank of a bolt 21, the head of said bolt engaging the upper end of the bolt 10 and the end of the shank 20 of the bolt is threaded as at 22 for the reception of a pawl engaging block 23, which block when forced inwardly between the pivoted dogs 17 force said dogs outwardly into engagement with the bearing sleeve 19.

From the above it will be seen that a bearing puller is provided which is simple in construction and one which may be utilized for pulling bearings from vehicle wheels or from any other place. It will also be seen that the supporting shafts 4 may be adjusted to be supported on surfaces adjacent the bearing to be pulled no matter what the relation of said surface to each other or to the bearing.

The invention having been set forth what is claimed as new and useful is: —

A bearing puller comprising a bar, adjustable supporting shafts carried by said bar adjacent its ends, a threaded shaft extending through the bar substantially centrally thereof and provided with a nut engaging the outer face of the bar, an adjustable head carried by the inner end of the threaded shaft, a plurality of dogs pivoted to adjustable head and extending outwardly and adapted to be forced into engagement with a bearing, a bolt extending through the threaded shaft and having its inner end disposed between the plurality of pivoted dogs, an engaging block disposed on the threaded end of the bolt and engaging said dogs, the head of the threaded bolt engaging the outer end of the threaded shaft and forming means whereby the threaded bolt may be rotated for moving the dog engaging block in the direction of the threaded shaft for forcing the free ends of the dogs outwardly.

In testimony whereof I have signed my name to this specification in the presence of two subscribing witnesses.

FRED CARLISLE.

Witnesses:
R. E. BERGER,
BEATRICE HAIGHT.